(No Model.)
R. EICKEMEYER.
BRUSH FOR ELECTRIC GENERATORS.
No. 397,492. Patented Feb. 12, 1889.
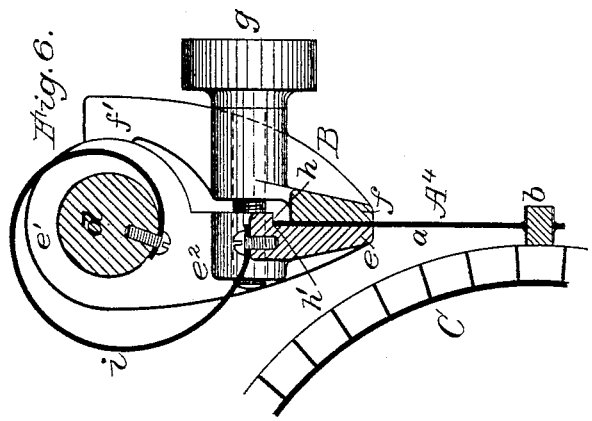
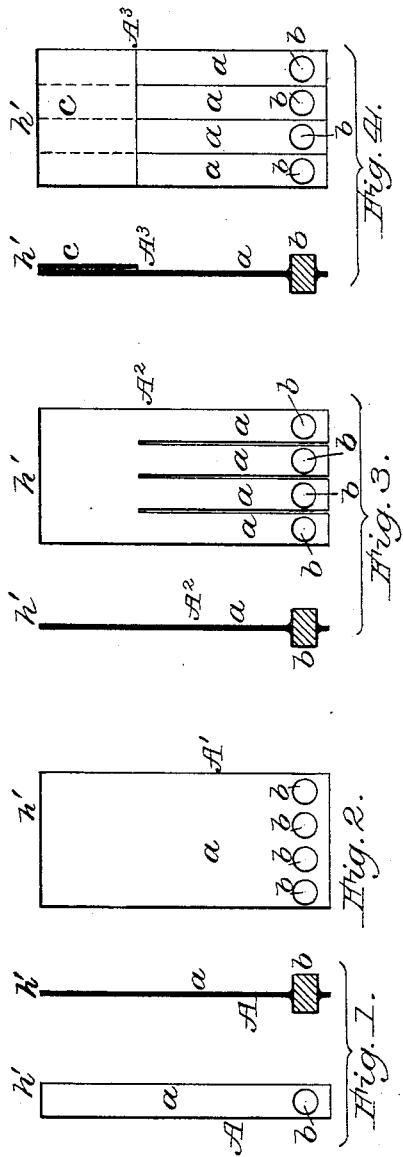
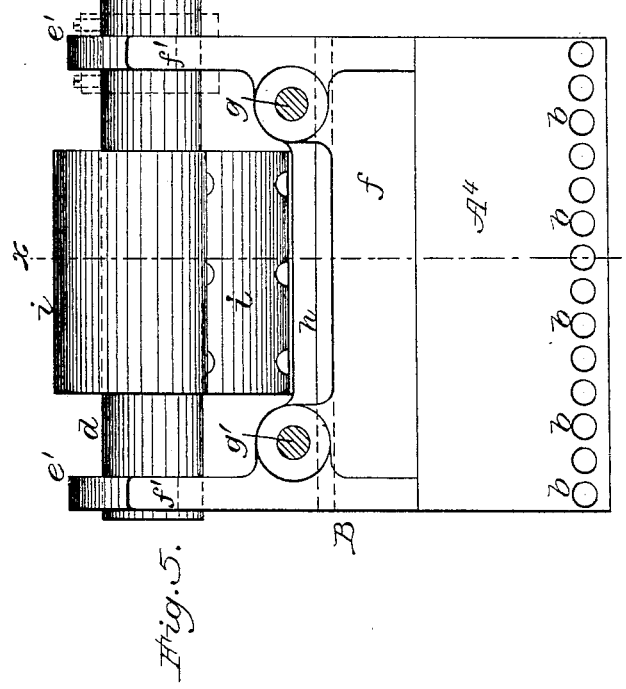
Attest:
Philip F. Larner.
Howell Bartle
Inventor:
Rudolf Eickemeyer.
By _____ Attorney.

UNITED STATES PATENT OFFICE.

RUDOLF EICKEMEYER, OF YONKERS, NEW YORK.

BRUSH FOR ELECTRIC GENERATORS.

SPECIFICATION forming part of Letters Patent No. 397,492, dated February 12, 1889.

Application filed October 17, 1888. Serial No. 288,344. (No model.)

*To all whom it may concern:*

Be it known that I, RUDOLF EICKEMEYER, of Yonkers, in the county of Westchester and State of New York, have invented certain new and useful Improvements in Electric Brushes for Electric Generators and Motors; and I do hereby declare that the following specification, taken in connection with the drawings furnished and forming a part of the same, is a clear, true, and complete description of my invention.

The objects of my invention are to secure between a rotative or movable electric conductor and a brush in electric contact therewith a reliable and efficient degree of conductivity coupled with the least possible destructive wear of the movable conductor and the greatest possible economy in the cost of the brushes, as well as in the matter of their application to machines in which they are to be used, and to enable their accurate adjustment therein to be promptly and easily accomplished. In my improved brushes I employ carbon for contact with the surfaces of movable or revolving conductors, and this feature is not broadly new, carbon having prior to my invention been employed in blocks or pieces tenoned into metallic blocks, the latter being variously connected with the brush-holders. I believe, however, that I am the first to directly unite or combine with a resilient brush plate or spring a carbon contact-block which is metallically connected or united with the spring, so that the carbon can have no movement independently of the spring, and also so that the electric connection between the carbon and the spring may be absolutely perfect.

I am also the first, as I believe, to provide an electric plate or brush-spring with a set or series of projecting carbon blocks which are arranged in a line and are slightly separated from each other for affording a free circulation of air not only between the brush-plate and the revolving conductor, but also between each of said carbon blocks, and thereby thoroughly obviating heating tendencies. With several carbons in line crosswise on one spring the torsional capacity of said spring admits of a peculiarly nice self-adjustment of the carbon-surfaces with appropriate portions of the surface of the revolving conductor, and still more so when the spring is complex and is composed of several narrow springs arranged side by side, each provided with a carbon contact, and all of the springs are clamped in a suitable brush-holder. Instead of having each of said narrow springs separate in structure, I also make them as parts of one spring by longitudinally slitting a spring-plate of proper width to afford a desired number of tongues, each serving as a spring and each having its own carbon contact.

In connecting the carbon contacts to the springs I secure a practically integral union by the use of metal-plated carbon, which can be securely soldered to a spring or firmly united by an electro-deposit of metal extending from the spring to and upon the carbon, and in either case I secure practically perfect electric conductivity between the carbon and spring, and by having the carbon in the form of plugs thus metallically connected and projecting from both sides of the spring the brush is rendered reversible after the carbon on one side has been worn away by use, and the reversal of the spring is conducive to permanent resiliency and enables it to be employed with many renewals of the carbon.

The use of a spring with the several carbon contacts or of several springs, each having a carbon contact and all held in one holder, enables small cylindrical pieces of carbon to be employed, and as these on many machines need be no larger in diameter than ordinary lamp-carbon, heretofore waste fragments thereof, they can be used with economic advantage, and these being usually already copper-coated are specially well adapted for my purposes.

Inasmuch as the springs themselves are neither impaired by use nor their length decreased, I have devised for use with my brushes a brush-holder provided with an abutting gage, against which the rear end of the spring is placed in contact, and as the brush-holder, although movable, is fixed with relation to the axis of a commutator-hub it will involve no skill whatever in the making of adjustments of the carbons to the commutating-point, because when the abutting gage of the holder and the rear end of a spring are in contact the carbon must of necessity occupy its precisely accurate position for duty, thus enabling the reversal of springs having partially-worn carbons or the substitution of fresh for worn brushes to be promptly and easily accomplished.

After describing my invention as illustrated in the drawings, the features deemed novel will be specified in the several clauses of claim hereunto annexed.

Referring to the drawings, Figure 1 illustrates in side view and in section one of my electric brushes in a simple form having but one carbon contact. Fig. 2 in side view illustrates one of my brushes having four carbon contacts. Fig. 3 illustrates in side view and section one of my complex brushes having four carbon contacts each on a tongue or spring, the several tongues or springs being integrally united at their inner ends. Fig. 4 in side view and section illustrates one of my complex springs having four carbon contacts each on a separate spring, said separate springs being united at their rear ends by means of a binding-plate soldered thereto. Fig. 5 in top view illustrates a brush-holder as devised by me for use with my carbon-brushes, and therewith is shown one of my brushes having fourteen carbon contacts. Fig. 6 is a vertical longitudinal sectional view of said holder and brush on line $x$, Fig. 5, and showing the carbon in contact with the surface of such a revolving conductor as is commonly employed in many electric generators and electric motors.

The brush A, Fig. 1, embodies a spring, $a$, composed of a single narrow strip of thin resilient metal of suitable electric conductivity and a single carbon contact, $b$. The carbon block is cylindrical in form and snugly occupies a hole in the spring, and a perfect metallic connection between them is obtained by soldering them together, or by an electro-deposit of metal lapping or extending from the spring upon adjacent surfaces of the carbon. When thus united, the brush is a practically integral structure, the two parts of which cannot be separated without actual breakage or cutting, and being thus united there is a perfect electric connection of said parts.

The carbon $b$, projecting from both sides of the spring, enables the brush to be reversed after the carbon has been worn away on one side, and then the opposite portion may be in like manner used. The reversal of the spring enables it to retain its desirable resiliency much better than if it were made to always exert its spring-pressure from one side only.

In Fig. 2 the brush A' embodies a wider spring, $a$, and four carbons, $b$, arranged in a line crosswise of the spring, and they are cylindrical and placed as near each other as is practicable, while affording sufficient intermediate portions of the spring to secure desired strength in the brush. It will be seen that with several carbons crosswise in a wide spring, when the latter is properly confined in a holder, there will be more or less torsional or twisting capacity in the spring, as well as a capacity to laterally curve or bend at the free end, and hence the several carbon contacts, although fixedly united to the spring, have, nevertheless, some slight capacity for self-adjustment of their faces with relation to the surfaces with which they are operated as brush-contacts. I render each contact still more sensitive in the matter of adjusting its face to moving surfaces in a more complex form of brush, $A^2$, (shown in Fig. 3,) wherein the brush embodies a spring-plate which is slitted longitudinally to afford four springs, $a$, each having at its free end a carbon contact, $b$, as before described. The rear end of the spring, being integral with the several tongues, secures highly efficient results as to conductivity, while affording to each carbon contact the delicate but reliable engagement with a moving conducting-surface which is incident to the independent resiliency of the spring-tongues. This form of brush will be generally preferred, although if the several tongues or springs be separately constructed and joined at their rear ends by being soldered to a plate, $c$, as in the brush $A^3$, Fig. 4, satisfactory results will accrue.

It will be obvious that my brushes can be used in many of the well-known forms of brush-holder; but for obviating the difficulties usually encountered in making accurate adjustments of the brush-contacts with relation to sectional rotating conductors of the bar-commutator class I have devised the brush-holder B, (shown in Figs. 5 and 6,) and its use for obtaining the best results involves also the use of sets of brushes which are of the same length between their rear ends and the centers of the carbon contacts, because said rear ends serve as gaging-surfaces, by means of which they are accurately mounted in the holder. This brush holder or clamp is mounted for service so as to be rotatively movable, as usual, on a rod or bar, $d$, and it is composed of a lower jaw, $e$, and an upper jaw, $f$. The lower jaw, $e$, has two rearwardly-projecting arms, $e'$, which have holes freely occupied by the rod or bar $d$, and said jaw has also two hubs, $e^2$, which are each bored vertically and threaded to receive clamp-screws. The upper jaw, $f$, has also two rearwardly-extending arms, $f'$, each of which bears on the top surface of an arm, $e'$, and said jaw has also two vertically-bored hubs, each above and in line with one of the hubs $e^2$, for the reception of clamp-screws $g$ $g'$, which are tapped into the hubs $e^2$, so that on turning said screws the faces of the two jaws $e$ and $f$ may be made to firmly clamp an interposed brush. At the rear of the clamping-point in these jaws there is a brush-adjusting gage, $h$, this being afforded by a vertical shoulder on the lower jaw. As is usual, the rod or bar $d$ is movable in the arc of a circle of which the axis of the commutator-hub C or other form of rotative conductor is the center, and therefore its relation to said axis is uniform, and the distance from the gage $h$ to the commutating-point is also unvariable. Now by having the brushes all of the same proper length it is only necessary to place a brush in the holder or clamp and evenly abut the rear end, $h'$ of the brush against said gage in order to locate the carbon contact with absolute accuracy at the precise point on the rotating conductor best suited for the purposes intended. As shown in Fig. 5, the brush $A^4$ is provided with fourteen carbons, $b$, and this illustrates one of the forms of my spring which has afforded highly satisfactory results.

For obtaining a yielding capacity independently of the resiliency of the brushes, I employ, as heretofore, a brush-holder spring, $i$, which is helical in form, and has its ends respectively attached to the rod or bar $d$ and the lower jaw, $e$, at its rear edge, as clearly indicated.

While I do not preclude myself from the use of carbon blocks in various forms, the cylindrical blocks can be employed with greater economy than any other, because of the facility with which the springs can be punched or bored to receive them and the convenience with which blocks of that form may be molded into complete form or in considerable lengths and readily cut to exact shorter lengths, and also because in large brushes lamp-carbon fragments can be economically utilized.

It will be seen that my brushes will operate equally well regardless of reversals in direction of rotation by the moving conductor, and that the intervening spaces between the contacts provide for the free circulation of air not only between the carbons, but also between the coincident surfaces of the spring and rotating conductor, and the detached particles of carbon incident to wear are much less liable to be collected and retained in the insulating spaces of a commutator-hub than when one large block or plate of carbon is employed.

The practically integral metallic connection between the carbons and the springs I deem of special value, and, although solder neatly applied serves a good purpose, I have secured the best results by first inserting the carbons into their seats and then uniting them by an electro-deposit of copper.

Although I have shown the carbons projecting from both surfaces of the springs, and although said feature constitutes one portion of my invention, said carbons may be applied to one side only of the springs without departure from other portions of my invention. The feature of providing each brush with a set of carbons, each having a small area of contact-surface, I deem of special value, and for enabling all parts of the revolving conducting-surface to be traversed by the carbons it will be sometimes desirable to use a pair of adjustable collars at one of the ears $e'$, as shown in dotted lines in Fig. 5, so that the holder may be variably adjusted on the rod $d$, the spring $i$ in such case being at one end secured to a sleeve provided with a clamp-screw, so that said sleeve may also be moved longitudinally on said bar $d$, and also enabling the force of said spring to be adjustably varied. The lubricating effect of detached particles of carbon renders the use of special lubricants unnecessary, and the wear of the surface of the movable conductors is much less than with any form of metal brush-contacts of which I have had practical knowledge. The rod $d$ is usually longitudinally adjustable, and the brushes themselves are readily adjusted laterally in the holder, thus providing for lateral adjustment of the carbons, although uniform wear will occur if the carbons of two opposite brushes be alternated in position.

Having thus described my invention, I claim as new and desire to secure by Letters Patent—

1. In an electric brush, the combination of a conducting-spring and a carbon contact-block integrally united thereto, substantially as described.

2. In an electric brush, the combination of a conducting-spring and a set of carbon contact-blocks arranged in line crosswise of the spring, substantially as described.

3. In an electric brush, the combination of a conducting-spring and one or more carbon contact-blocks projecting from opposite sides of said spring, substantially as described, whereby the brush is rendered reversible, and enabling both ends of said carbons to be alternately applied to duty and used up in service.

4. In an electric brush, the combination of a series of conducting-springs, each independently resilient and arranged side by side, and each having a carbon block at its free end, substantially as described.

5. In an electric brush, the combination, with a conducting-spring, of a metal-plated carbon block integrally secured to the free end of said spring, substantially as described.

6. The combination, with a commutator-hub, of a brush holder or clamp provided with a brush-adjusting gage and a brush-spring having a carbon contact-block at its free end, and also having a length between its rear end and the center of said block which exactly corresponds with the distance between the brush-adjusting gage in the holder and the commutating-point on said hub, substantially as described, whereby the perfect electric adjustment of the brush is accomplished by merely placing the brush in the holder against the gage and clamping it.

RUDOLF EICKEMEYER.

Witnesses:
JAMES S. FITCH,
C. D. DANFORTH.